No. 693,391. Patented Feb. 18, 1902.
W. J. HOLLAND.
TRAP.
(Application filed June 27, 1901.)
(No Model.)
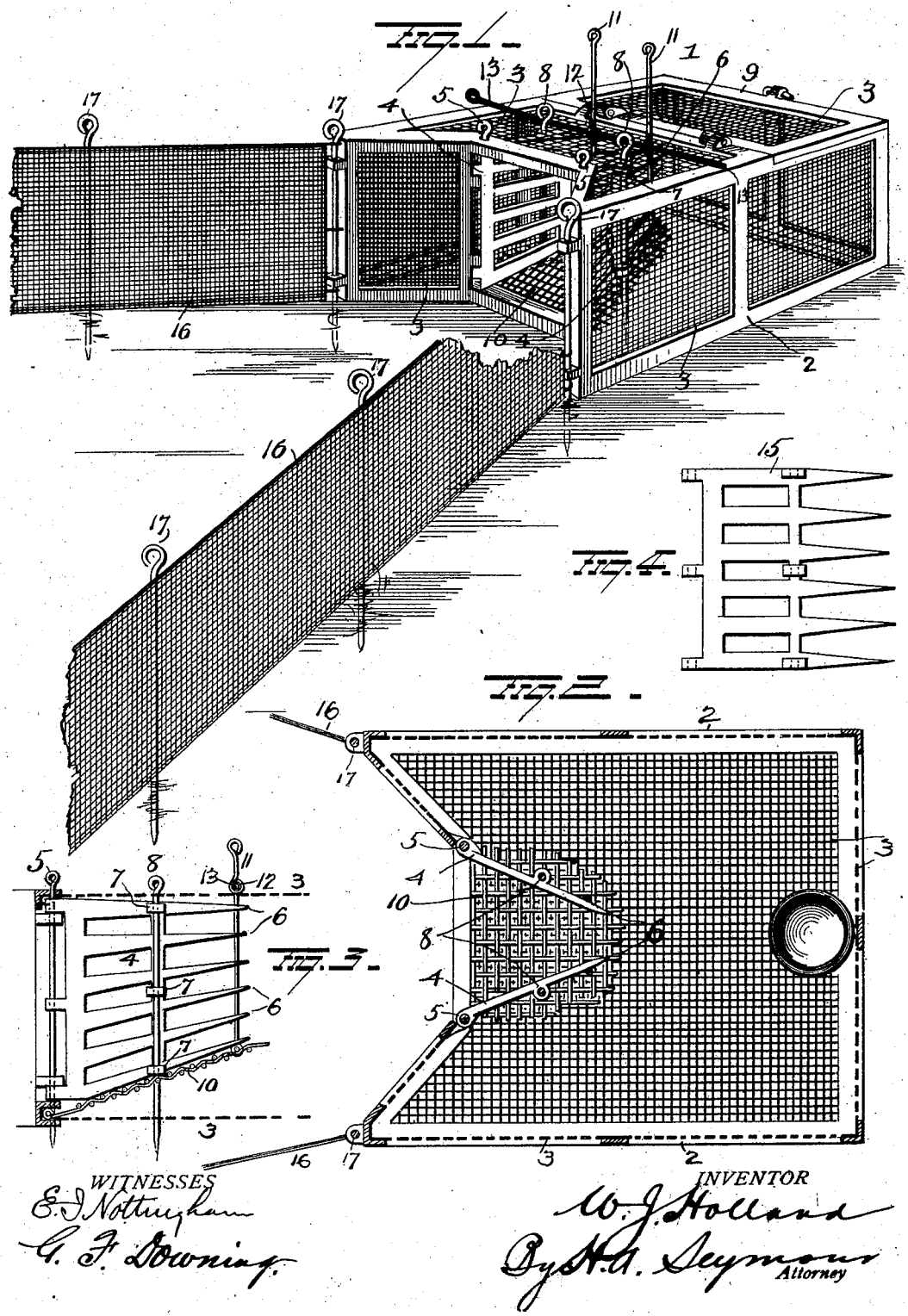
WITNESSES
INVENTOR
Attorney

UNITED STATES PATENT OFFICE.

WILLIAM J. HOLLAND, OF ERA, TEXAS.

TRAP.

SPECIFICATION forming part of Letters Patent No. 693,391, dated February 18, 1902.

Application filed June 27, 1901. Serial No. 66,260. (No model.)

*To all whom it may concern:*

Be it known that I, WILLIAM J. HOLLAND, of Era, in the county of Cooke and State of Texas, have invented certain new and useful Improvements in Traps; and I do hereby declare the following to be a full, clear, and exact description of the invention, such as will enable others skilled in the art to which it appertains to make and use the same.

My invention relates to an improvement in traps designed more particularly for catching small animals, but adapted also for catching fish and larger animals; and it consists in a cage or open box or receptacle having an opening at one end and a series of inwardly-converging guides adjustably held in position in the casing, in combination with adjustable wings secured at their inner ends to the cage adjacent to the converging guides.

My invention further consists in the parts and combination of parts, as will be more fully described, and pointed out in the claims.

In the accompanying drawings, Figure 1 represents a perspective view of my improved trap. Fig. 2 is a view in horizontal section of same. Fig. 3 is a view in section, showing one of the guides and platform; and Fig. 4 is a view of a modified form of guide.

1 represents a cage or compartment composed of a frame 2, having an open or reticulated covering 3. This cage or compartment is preferably rectangular in shape; but its size and shape will depend altogether on the use to which it is to be put. One end of the cage is set back, as shown, the center thereof from the bottom preferably to the top being open for the entrance of the animal. Pivotally secured to the standards forming the frame of the opening are the inwardly-projecting guides 4 4. These guides are pivotally secured in place by the removable rods 5 5 and preferably provided at their inner ends with the prongs or points 6, which latter are adapted to prevent the egress of an animal that has passed into the cage. These guides are provided on their outer faces with the loops 7, through which the removable securing-rods 8 pass. These rods are adapted to be passed through the top of the cage, through the loops 7, and bottom of the cage into the ground and hold the inner pointed ends 6 of the guides solidly in position. These guides 4 4 are arranged to converge inwardly, with their inner ends separated just sufficient to permit of the free and ready passage into the cage of the animal to be trapped, their pointed ends being sufficiently close together as to prevent the escape of the animal. The box or cage is provided at its top or end with a suitable door 9, through which the animal, game, or fish may be removed.

In order to make the trap effective for animals of varying size, I provide the movable platform 10. This platform is pivoted at its front end to the open end of the cage or box immediately in rear of said opening and is connected at its rear end with the rods 11 11, which latter pass up through the open top of the cage and are provided with loops 12 12, through which the holding pin or rod 13 passes. When this platform 10 is used, the guides 4 4 are necessarily provided with inclined lower edges to permit the platform to be raised to an inclined position. With this construction it will be seen that the animal entering the cage passes up the platform and in order to reach the bait jumps to the floor of the cage. The inner end of this platform is provided with prongs 14, and hence it will be seen that after the animal has once passed between the guides 4 4 it will be extremely difficult, if not impossible, for it to reach the platform and escape, thus making it possible to catch rats and mice or other animals or fowls varying in size with a constant and unvarying opening. This opening of course can be varied for animals of various sizes; but each adjustment will be effective for different bodies within reasonable limits.

When the device is used for capturing fowls, either wild or domestic, or for catching fish, the platform 10 should be lowered onto the floor of the cage and guides 15, substantially as shown in Fig. 4, having parallel upper and lower edges, be employed in lieu of the guides 4 4, having inclined edges, as shown in Figs. 1 and 3.

In order to direct the animals to the cage, I prefer to provide the latter with two flexible side wings 16 16, provided at intervals with the stakes or posts 17, designed to be driven into the ground for holding the wings in their upright positions.

This trap is admirably adapted for catching rats, mice, rabbits, and other smaller animals and is also particularly adapted for catching fish. It could also be used for trapping the larger animals, such as the horse and cow, and I have found that by leaving the cage open—that is to say, by keeping the guides sufficiently far apart to permit of the ready ingress and egress of the animals, particularly domestic animals and fowls—and by keeping the cage supplied with bait they become accustomed to the cage and are readily driven into it when wanted.

In my device, which is preferably made wholly of metal, there are no swinging or tilting parts to get out of order. Hence the liability to injury or failure to operate at the proper time is reduced to a minimum.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. In a trap, the combination with a cage having an ingress-opening therein, of hinged guides converging inwardly from said ingress-opening and removable fastening-rods for locking the said guides in place at different adjustments.

2. In a trap, the combination with a cage having an ingress-opening therein, of guides having pointed inner ends and converging inwardly from said ingress-opening and fastening-rods pivotally connecting said guides to the cage and removable rods for locking the said guides in place at different adjustments.

3. In a trap, the combination with a cage having an ingress-opening therein, of guides removably secured to said cage adjacent to said opening, rods for locking said guides in place and an adjustable platform located below said guides, substantially as set forth.

4. In a trap, the combination with a cage having an ingress-opening therein, of a platform within said cage adjacent to base of the cage and pivoted at the base of said opening, adjusting-rods secured to the free inner end of said platform and adjustable guides on opposite sides of the ingress-opening and above said platform.

5. In a trap, the combination with a cage having an ingress-opening, movable wings connected to the outside of said cage on opposite sides of said opening and removable pins for securing said wings at any desired adjustment, of guides pivoted to the cage on opposite sides of the opening and projecting inwardly into the cage and adjustable devices engaging said guides for locking them in place.

In testimony whereof I have signed this specification in the presence of two subscribing witnesses.

WILLIAM J. HOLLAND.

Witnesses:
S. G. NOTTINGHAM,
A. W. BRIGHT.